(12) United States Patent
Seto et al.

(10) Patent No.: US 7,120,520 B2
(45) Date of Patent: Oct. 10, 2006

(54) ENERGY MANAGEMENT DEVICE

(75) Inventors: Keisuke Seto, Susono (JP); Hiroshi Isono, Toyota (JP); Kei Takakuwa, Chiryu (JP); Takahiro Kodaira, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 221 days.

(21) Appl. No.: 10/856,884

(22) Filed: Jun. 1, 2004

(65) Prior Publication Data

US 2004/0249516 A1    Dec. 9, 2004

(30) Foreign Application Priority Data

Jun. 9, 2003    (JP) .............................. 2003-163186

(51) Int. Cl.
*G06F 19/00*    (2006.01)
*H02J 1/10*    (2006.01)
(52) U.S. Cl. ........................ 700/297; 700/295; 307/18; 307/31; 307/80; 419/7; 419/13
(58) Field of Classification Search ................ 700/286, 700/295, 297; 419/7, 13; 307/18, 31, 80
See application file for complete search history.

(56) References Cited

U.S. PATENT DOCUMENTS

| | | | |
|---|---|---|---|
| 6,029,092 A * | 2/2000 | Stein | 700/11 |
| 6,068,941 A | 5/2000 | Fuller et al. | |
| 6,103,410 A | 8/2000 | Fuller et al. | |
| 6,673,479 B1 * | 1/2004 | McArthur et al. | 429/12 |
| 2003/0085621 A1 * | 5/2003 | Potega | 307/18 |
| 2004/0110044 A1 * | 6/2004 | McArthur et al. | 429/13 |

FOREIGN PATENT DOCUMENTS

| | | |
|---|---|---|
| EP | 1 291 949 A2 | 3/2003 |
| JP | A 8-273680 | 10/1996 |
| JP | A 11-178234 | 7/1999 |
| JP | A 11-178237 | 7/1999 |
| JP | A 2001-8380 | 1/2001 |
| JP | A 2001-258177 | 9/2001 |
| JP | A 2003-32896 | 1/2003 |
| WO | WO 03/041202 A2 | 5/2003 |
| WO | WO 03/071615 A2 | 8/2003 |

* cited by examiner

*Primary Examiner*—Leo Picard
*Assistant Examiner*—Douglas S. Lee
(74) *Attorney, Agent, or Firm*—Oliff & Berridge, PLC

(57) ABSTRACT

An energy management device is provided in a first energy related system and manages transfer of energy between the first energy related system and a second energy related system remote from the first energy related system, each of the first and second energy related systems including, as an energy related element, at least one of an accumulation unit which accumulates energy, a consumption unit which consumes energy, and a generation unit which generates energy. In the energy management device, a communication unit exchanges information between the first energy related system and the second energy related system, the information related to at least one of the energy consumption, the energy accumulation and the energy generation in each of the first and second energy related systems. A supply control unit controls supplying of energy from one of the first and second energy related systems to the other based on contents of the exchanged information.

10 Claims, 6 Drawing Sheets

ENERGY MANAGEMENT DEVICE

CROSS-REFERENCE TO RELATED APPLICATION

This application is based upon and claims the benefit of priority from the prior Japanese patent application No. 2003-163186, filed on Jun. 9, 2003, the entire contents of which are incorporated herein by reference.

BACKGROUND OF THE INVENTION

1. Field of the Invention

The present invention relates to an energy management technology of managing the transfer of energy between a plurality of energy related systems.

2. Description of the Related Art

For example, the energy management technology of managing the transfer of energy between a plurality of energy related systems is known from Japanese Laid-Open Patent Application No. 2001-008380.

Japanese Laid-Open Patent Application No. 2001-008380 discloses a conventional system that is capable of transferring power of the electric vehicle to the residence.

Specifically, this conventional system carries out charging of the battery of the electric vehicle by the home power supply in the residence and supplying of power from the battery of the electric vehicle to the home power supply. According to the conventional system, the electric power supply from the electric vehicle to the residence is performed so that the electric energy required for the usual travel of the electric vehicle (i.e., the user's everyday life area) can be secured to the battery of the electric vehicle. Therefore, even if the use of the electric vehicle is needed unexpectedly, it is not necessary to cause the trouble to the use.

However, in the conventional system, the power supply from the electric vehicle to the residence is performed only in one direction, regardless of whether the residence needs the electric power supply from the outside. In other words, even when it is the case where the residence actually does not need the external power supply, it is impossible to avoid the supplying of the electric power of the electric vehicle to the residence.

Therefore, the conventional system has the difficulty in eliminating the possibility that the electric power of the electric vehicle is unnecessarily supplied to the residence.

SUMMARY OF THE INVENTION

An object of the present invention is to provide an improved energy management device in which the above-mentioned problems are eliminated.

Another object of the present invention is to provide an energy management device which appropriately carries out the supplying of energy from one of the plurality of energy related systems to another energy related system and vice versa in the management of the transfer of energy between the plurality of energy related systems.

The above-mentioned objects of the present invention are achieved by an energy management device which is provided in a first energy related system and manages transfer of energy between the first energy related system and a second energy related system remote from the first energy related system, each of the first and second energy related systems including, as an energy related element, at least one of an accumulation unit which accumulates energy, a consumption unit which consumes energy, and a generation unit which generates energy, the energy management device comprising: a communication unit exchanging information between the first energy related system and the second energy related system, the information related to at least one of the energy consumption, the energy accumulation and the energy generation in each of the first and second energy related systems; and a supply control unit controlling supplying of energy from one of the first and second energy related systems to the other based on contents of the exchanged information.

According to the energy management device of the present invention, it is possible to exchange the information related to at least one of the consumption, the accumulation and the generation of energy in each system between the plurality of energy related systems in advance of the transferring of energy from one of the plurality of energy related systems to another.

Therefore, according to this energy management device, it is possible to determine in advance whether it is appropriate that the second energy related system serves as the energy sender to supply energy to the first energy related system when the first energy related system actually needs external power supply from the second energy related system. Thus, the energy sender can be selected by taking into consideration the situation of the other energy related systems, and therefore, it is possible to easily perform the selection of the appropriate energy sender from among the other energy related systems.

In addition, according to this energy management device, when the first energy related system is about to supply energy to the second energy related system, it is possible for the first energy related system to determine in advance whether the supply of energy from the first energy related system is actually needed by the second energy related system. Thus, the energy receiver can be selected by taking into consideration the situation of the other energy related systems, and therefore, it is possible to appropriately determine the necessity of energy supply to the energy receiver, and it is possible to easily perform the selection of the appropriate energy receive from among the other energy related systems.

The term "energy" in the present invention should be interpreted to include electrical energy, heat energy, optical energy, power energy, etc. In addition, the "energy related system" in the present invention can be constituted to have the tendency sticking to the land (real-estate property) or to have the mobility or the portability (movable property).

The energy related system constituted to have the real-estate property should be interpreted to include: (a) the residence (the individual residence, the group residence, etc.) which usually has at least the consumption unit and has the generation unit and/or the accumulation unit depending on the situation; (b) the power plant which generates electricity chiefly; and (c) the natural energy power generation device which generates electricity using the natural energy, such as the sun, the wind force, etc.

On the other hand, the energy related system constituted to have the movable property should be interpreted to include the automotive vehicle (the car, the motorcycle, etc.) as a moving object having the consumption unit, the accumulation unit, and the generation unit.

Therefore, the relation between the first energy related system (the self-energy related system) and the second energy related systems (the other energy related systems) should be interpreted to include the relation between the residences, the relation between the residence and the power plant or the natural energy power generation device, the relation between the residence and the vehicle, and the relation between the vehicles.

In addition, the term "energy related system" in the present invention should be interpreted to be the system which has the dependency to other energy related systems from the viewpoint of energy and has the independence from other energy related systems from the viewpoint of physics.

The above-described energy management device of the present invention may be configured so that the supply control unit comprises a transmitting unit transmitting, prior to the supplying of energy from one of the first and second energy related systems, which is an energy sender, to the other of the first and second energy related systems, which is an energy receiver, a request signal for requesting the supplying of energy of the energy sender to the energy receiver, from the energy receiver to the energy sender, and the energy sender receives the request signal from the energy receiver and transmits a response signal to the energy receiver, so that the energy sender supplies energy to the energy receiver.

In this energy management device, the request signal for requesting the supplying of energy of the energy sender (one of the first and second energy related systems) to the energy receiver (the other of the first and second energy related systems) is sent from the energy receiver to the energy sender and the response signal in reply to the request signal is sent from the energy sender back to the energy receiver, and thereafter, the energy sender supplies energy to the energy receiver.

Therefore, according to this energy management device, the supply of energy is performed in response to the demand of energy, and it is possible to easily achieve balancing of the demand and the supply.

Moreover, the above-described energy management device of the present invention may be configured so that signals, received and transmitted by the supply control unit, in order to exchange information between the first energy related system and the second energy related system, include a request signal for requesting the supplying of energy of one of the first and second energy related systems to the other, and a response signal for permitting the request of the supplying of energy of one of the first and second energy related systems to the other.

In this energy management device, the signals including the request signal which request the supplying of energy of one of the first and second energy related systems to the other energy related system, and the response signal which permits the request of the supplying of energy of one of the first and second energy related systems to the other are received and transmitted by the supply control unit.

Therefore, according to this energy management device, it is possible to carry out the supplying of energy from one of the two systems to the other by sending the response signal in response to the demand of energy sent from the other of the two systems to the one of the two systems.

Therefore, according to this energy management device, it is possible to easily perform the appropriate energy supply to the other of the two systems from one of the two systems so that the demand of energy at the energy receiver may be suited. Thus, according to this energy management device, it is possible to easily achieve balancing of the demand of energy and the supply of energy between the two systems.

Moreover, the above-described energy management device of the present invention may be configured so that the communication unit comprises an exchange unit exchanging, prior to shifting of a first state in which electrical delivery and receiving of energy between the first and second energy related systems is not possible to a second state in which electrical delivery and receiving of energy between the first and second energy related systems is possible, the information between the first energy related system and the second energy related system.

According to this energy management device, it is possible to easily perform the transfer of energy appropriately by taking into consideration the state of the two systems, the demand, etc. immediately after the time of shifting to the second state in which electrical delivery and receiving of energy is possible, unlike the case where information cannot be exchanged between the first and second energy related systems after the first state in which electrical delivery and receiving of energy between the first and second energy related systems is not possible is completely shifted to the second state.

It is assumed that the energy management device of the present invention is applied to an environment in which one of the first and second energy related systems is the battery of the electric vehicle and the other is the power generation/accumulation device. For example, when it is needed to charge the battery of the electric vehicle, the power generation/accumulation device can be operated promptly in response to the demand of energy of the electric vehicle, preceding to the arrival of the electric vehicle at the power generation/accumulation device. For example, if, preceding to the arrival of the electric vehicle at the power generation/accumulation device, the generation unit of the power generation/accumulation device is made to generate electrical power and the accumulation unit of the power generation/accumulation device is made to accumulate the generated power therein, it is possible for this energy management device to supply the power accumulated in the accumulation unit of the power generation/accumulation device to the electric vehicle immediately when the electric vehicle arrives at the power generation/accumulation device.

Moreover, the above-described energy management device of the present invention may be configured so that the second energy related system comprises a plurality of other energy related systems different from the first energy related system, the communication unit is configured to exchange the information between the first energy related system and the plurality of other energy related systems, and the supply control unit is configured to select one of the plurality of other energy related systems as being a system delivering and receiving energy between the first energy related system and the plurality of other energy related systems, based on the contents of the exchanged information.

According to this energy management device, it is possible to easily choose one of the plurality of other energy related systems based on the contents of the exchanged information as being a proper system supplying energy to the first energy related system (the self-energy related system) or a proper system receiving energy from the first energy related system (the self-energy related system).

Moreover, the above-described energy management device of the present invention may be configured so that the supply control unit comprises: a target setting unit setting a desired value required for control of the first energy related system; and a selection unit selecting one of the plurality of other energy related systems as being appropriate for supplying energy to the first energy related system, based on the desired value and the contents of the exchanged information.

Moreover, the above-described energy management device of the present invention may be configured so that the selection unit comprises: an environmental-information acquisition unit acquiring environmental information related to an environment which affects the consumption of energy in the first energy related system; and an energy supply mode determination unit selecting one of the plurality of other energy related systems as supplying energy to the first energy related system, based on the acquired environmental information, the desired value, and the contents of the exchanged information, so that the energy supply mode determination unit determines an energy supply mode of supplying energy to the first energy related system.

Moreover, the above-described energy management device of the present invention may be configured so that the energy management system further comprises a control unit controlling the first energy related system and computing a desired value required for said control by using power or workload as a unit which is common to the first energy related system and the second energy related system.

According to this energy management device, it is possible to easily control each energy related system in the relation between the first and second energy related systems from the viewpoint of effective use of energy resources, such as effective mutual use of energy and synthetic saving of energy.

Moreover, the above-described energy management device of the present invention may be configured so that the first energy related system comprises at least two of the consumption unit, the accumulation unit and the generation unit as energy related elements, and the energy management device further comprising a control unit controlling the at two energy related elements and computing a desired value and an actual value required for control of each of the at least two energy related elements by using power or workload as a unit that is mutually common between the at least two energy related elements.

According to this energy management device, it is possible to easily control each energy related element in the relation with other energy related elements from the viewpoint of effective use of energy resources, such as effective mutual use of energy and synthetic saving of energy.

Moreover, the above-described energy management device of the present invention may be configured so that the first energy related system comprises at least one of the consumption unit and the generation unit as the energy related element.

BRIEF DESCRIPTION OF THE DRAWINGS

Other objects, features and advantages of the present invention will become apparent from the following detailed description when read in conjunction with the accompanying drawings.

DETAILED DESCRIPTION OF PREFERRED EMBODIMENTS

A description will now be provided of the preferred embodiments of the present invention with reference to the accompanying drawings.

Figure 1:
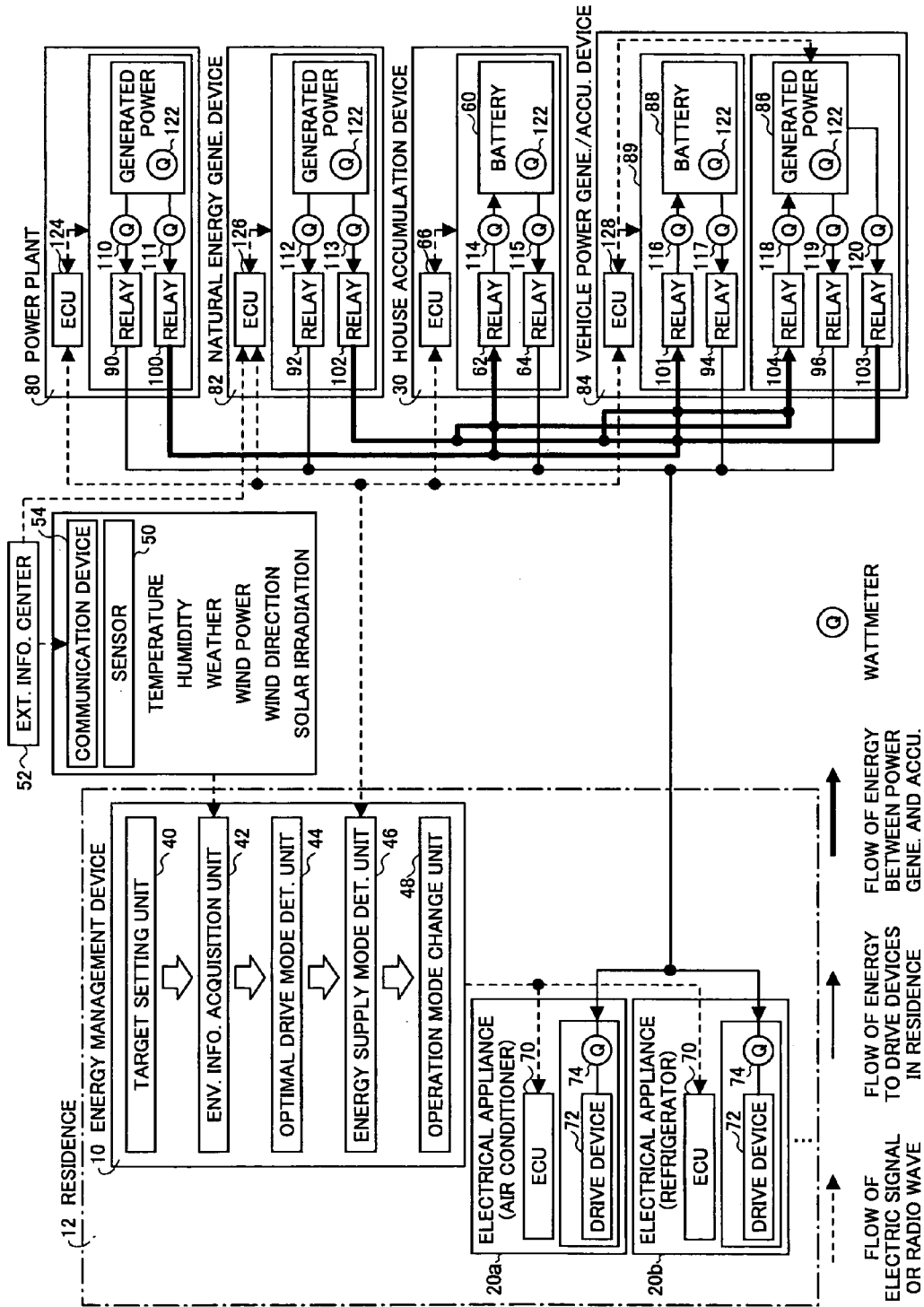
FIG. 1 is a block diagram showing the hardware composition of a self-energy related system and other energy related systems, the self-energy related system being provided with a preferred embodiment of the energy management device of the invention.

FIG. 1 shows the hardware composition of a residence 12 which is a self-energy related system in which the energy management device 10 in the preferred embodiment of the invention is provided.

In the present embodiment, the residence 12 is provided with the energy management device 10, the plurality of electrical appliances 20 as the consumption unit which consumes electrical energy, and the house accumulation device 30 as the accumulation unit which accumulates electrical energy.

The air-conditioner 20a and the refrigerator 20b are installed in the residence 12 as the plurality of electrical appliances 20 as shown in FIG. 1.

As shown in FIG. 1, the energy management device 10 is configured to include the target setting unit 40, the environmental-information acquisition unit 42, the optimal drive mode determination unit 44, the energy supply mode determination unit 46, and the operation mode change unit 48.

The residence 12 which is the self-energy related system is further provided with the communication device 54 which exchanges information with the required sensor 50 and the external information center 52 (for example, the meteorological agency), in order to support for the environmental-information acquisition unit 42 to detect the temperature, the wind force, the wind direction, the solar irradiation, etc. which are the environmental information items.

As shown in FIG. 1, the house accumulation device 30 in the present embodiment is configured so that the battery 60 may be included as an accumulation medium, the fuel cell etc. can be constituted so that other accumulation media may be included.

As indicated by the dotted-line arrow in FIG. 1, the wired or wireless communication is possible between the energy management device 10 and the house accumulation device 30, so that the required information can be mutually exchanged.

As indicated by the thick-line arrow in FIG. 1, the house accumulation device 30 can accumulate selectively the electrical energy which supplied from the outside to the battery 60 through relay 62.

Figure 2:
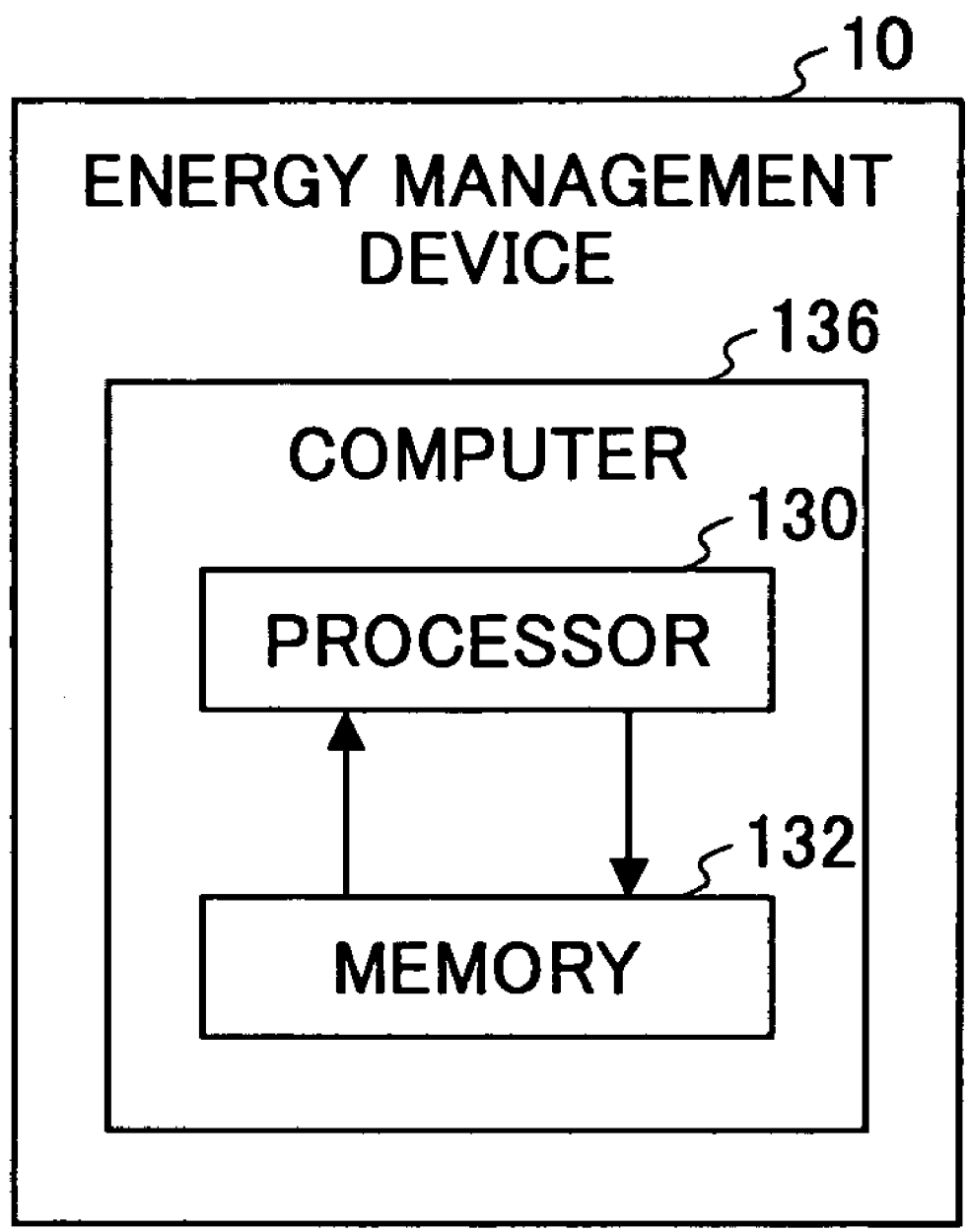
FIG. 2 is a block diagram showing the hardware composition of the energy management device in FIG. 1.

As indicated by the thin-line arrow in FIG. 2, the house accumulation device 30 can supply electrical energy to each electrical appliance 20 in the residence 12 selectively through relay 64. That is, the power transmission from the house accumulation device 30 to each electrical appliance 20 is selectively possible.

Moreover, the house accumulation device 30 includes the electronic control unit (called ECU) 66, in order to perform the communication and to control ON/OFF of the relays 62 and 64. The ECU 66 is constituted to serve as the computer, and the predetermined function is realized by executing the required program by the computer.

As shown in FIG. 1, in the residence 12, each electrical appliance 20 is provided to include the ECU 70 and the drive device 72 (for example, the electric motor) controlled by the ECU 70. Further, each electrical appliance 20 includes the wattmeter 74 for detecting the power supplied to the corresponding drive device 72 (i.e., the power consumption).

In addition, in the present specification, the term "power" should be flexibly interpreted according to the situations. In a narrow sense the term "power" is used to mean electrical power, and in a wide sense the term "power" is used to mean electric energy (workload) or electrical energy.

As shown in FIG. 1, the residence 12 is correlated with the power plant 80, the natural energy power generation device 82, and the vehicle power generation/accumulation device 84, which are the other energy related systems separate from the self-energy related system.

The power plant 80 is a widely used energy institution which generates electrical energy, such as steam-generated energy, nuclear energy, and hydraulic power energy.

The natural energy power generation device 82 is a small-scale device which generates electrical energy using the cheap energy and does not need the large-scale institution in order to take out the natural energy, such as the wind power energy or the solar energy.

The automotive vehicle is provided to include the power generation device 86 containing the alternator, the regeneration motor, the fuel cell, etc. and the accumulation device 89 containing the battery 88. The vehicle power generation/accumulation device 84 is constituted with the power generation device 86 and the accumulation device 89 which are provided in the automotive vehicle.

As indicated by the dotted-line arrow in FIG. 1, the wired or wireless communication can be performed by the energy management device 10 of the residence 12 using the cable or radio wave between the energy management device 10 and the other energy related systems. By performing the communication, it is possible to exchange the information mutually between the energy management device 10 and the other energy related systems.

As indicated by the thin-line arrow in FIG. 1, electrical energy can be supplied to the residence 12 from the other energy related systems. That is, electrical power can be transmitted from the other energy related systems to the residence 12.

Specifically, the generated power in the power plant 80 can be supplied to the plurality of electrical appliances 20 in the residence 12 through relay 90, and the generated power in the natural energy power generation device 82 can be supplied to the plurality of electrical appliances 20 in the residence 12 through relay 92, respectively.

Furthermore, the accumulated power in the battery 88 of the vehicle can be supplied to the plurality of electrical appliances 20 in the residence 12 through relay 94, and the generated power in the vehicle can be supplied to the plurality of electrical appliances 20 in the residence 12 through relay 96, respectively. Namely, the vehicle is provided with both the power generation device 86 and the accumulation device 88, and hereinafter they are called the vehicle power generation device 86 and the vehicle accumulation device 89, respectively.

In addition, the house accumulation device 30 can be physically correlated with the residence 12. Alternatively, apart from that shown in FIG. 1, the house accumulation device 30 may be illustrated in FIG. 1 as the internal component of the residence 12 (i.e., the internal component of the self-energy related system).

However, the house accumulation device 30 is the same as the power plant 80, the natural energy power generation device 82 and the vehicle, in the meaning that electrical energy can be externally supplied to the electrical appliances 20 in the residence 12. Therefore, in the embodiment of FIG. 1, the house accumulation device 30 is shown out of the frame in which the residence 12 is shown so that the same category as the power plant 80 or the like may be formed.

Therefore, the house accumulation device 30 may be considered as being part of the self-energy related system when it is classified physically, but it may also be considered as being one of the other energy related systems when it is classified functionally based on the current situation that the accumulation device is scarcely installed in the usual residence.

It is also possible to transfer electrical energy from the power generation place to the power accumulation place between the power plant 80, the natural energy power generation device 82 and the vehicle power generation device 86 each of which has the power generation capacity, and the house accumulation device 30 and the vehicle accumulation device 89 each of which has the power accumulation capacity.

Specifically, the generated power in the power plant 80 is supplied to the house accumulation device 30 through the relay 100 and accumulated into the battery 60 of the house accumulation device 30 through the relay 62, and the same is also supplied to the vehicle accumulation device 89 through the relay 100 and accumulated into the battery 88 of the vehicle accumulation device 89 through the relay 101.

Furthermore, the generated power in the natural energy power generation device 82 is supplied to the house accumulation device 30 through the relay 102 and accumulated into the battery 60 of the house accumulation device 30 through the relay 62, and the same is also supplied to the vehicle accumulation device 89 through the relay 102 and accumulated into the battery 88 of the vehicle accumulation device 89 through the relay 101.

Furthermore, the generated power in the vehicle power generation device 86 is supplied to the house accumulation device 30 through the relay 103 and accumulated into the battery 60 of the house accumulation device 30 through the relay 62, and the same is also supplied to the vehicle accumulation device 89 through the relay 103 and accumulated into the battery 88 of the vehicle accumulation device 89 through the relay 101.

Furthermore, in the present embodiment, the generated power in the power plant 80 and the generated power in the natural energy power generation device 82 can be taken into the vehicle power generation device 86 through the relay 104 as the generated power.

As is apparent from the foregoing, the energy management system of the present embodiment is provided to allow both the exchange of information and the transfer of electrical energy between the plurality of energy related systems in a bi-directional manner.

As shown in FIG. 1, in order to measure power which has flowed through each relay, the wattmeter (Q) is provided in each of the power plant 80, the natural energy power generation device 82, the house accumulation device 30, and the vehicle power generation/accumulation device 84 (which are called the plurality of power generation/accumulation devices).

Specifically, in the power plant 80, the power which has flowed through the relay 90 and the relay 100, respectively, is measured by the wattmeter 110 and the wattmeter 111. In the natural energy power generation device 82, the power which has flowed through the relay 92 and the relay 102, respectively, is measured by the wattmeter 112 and the wattmeter 113. In the house power generation device 66, the power which has flowed through the relay 62 and the relay 64, respectively, is measured by the wattmeter 114 and the wattmeter 115.

Furthermore, in the vehicle accumulation device 89, the power which has flowed through the relay 101 and the relay 94, respectively, is measured by the wattmeter 114 and the wattmeter 115. In the vehicle power generation device 86, the power which has flowed through the relay 104, the relay 96 and the relay 103, respectively, is measured by the wattmeter 116, the wattmeter 117 and the wattmeter 118.

Furthermore, in order to measure the amount of actual power generation of the generation unit or the amount of actual power accumulation of the accumulation unit in each of the plurality of power generation/accumulation devices, the wattmeter 122 is also provided.

Furthermore, the power plant 80, the natural energy power generation device 82, and the vehicle power generation/accumulation device 84 are provided with the ECU 124, the ECU 126, and the ECU 128, in order to realize the function of performing the communication with the energy management device 10, and the function of controlling ON/OFF of the relays 90, 92, 94, 96, 100, 101, 102, 103 and 104 similar to the house accumulation device 30.

FIG. 2 shows the hardware composition of the energy management device 10 in FIG. 1.

As shown in FIG. 2, the energy management device 10 is constituted primarily with the computer 136 which includes the processor 130 and the memory 132. In the memory 132, a plurality of programs, which are executed by the processor 130, are stored in advance, in order to realize the predetermined function of the energy management device 10. These programs contain the energy management program the control procedure of which is illustrated with the flowchart of FIG. 3.

Next, a description will be given of the energy management program with reference to FIG. 3.

When the computer 136 executes the energy management program stored in the memory 12, the control starts from step S1. In the step S1, the target parameters are inputted to the computer 136.

Specifically, in the step S1, based on the intention of the user of the residence 12, the target inside temperature, the target humidity, the target attainment time of the actual temperature, the ventilation time, etc. are inputted as the target parameters.

In the following step S2, the required environmental information is acquired using the sensor 50 and/or the communication device 54.

Specifically, the inside temperature of the residence 12, the outside temperature, the inside humidity, the outside humidity, the weather (the relation with the solar irradiation), the anticipated weather, the wind force, etc. are acquired as the environmental information.

In order to realize the target parameters, it is desirable for the improvement in control precision that the environmental information is taken into consideration as the disturbance when computing the electrical energy that is appropriate for being supplied to each electrical appliance 20.

In the following step S3, a required energy for the residence 12 is computed by totaling respective target energy of the electrical appliances 20 in the residence 12.

The target energy for each electrical appliance 20 can be computed based on the target parameters and the environmental information. That is, in the present embodiment, the desired value required for control of each electrical appliance 20 is computed by using power (or workload) as a unit which is common to the plurality of electrical appliances 20.

In the step S3, when two or more combinations of the electrical appliances 20 exist and the same target parameter is realized, one of the combinations of the electrical appliances 20, which serves as the minimum among those of the combinations of them, is selected, and the required energy is computed with respect to the selected combination.

Therefore, according to this computation, in order to realize the same target parameter, the kind (i.e., the drive mode) of the electrical appliances 20 which are driven all at once is optimized in the relation with consumption energy reduction.

In the following step S4, in order to compute the power (or voltage or current) which should be supplied to each electrical appliance 20 for each instant in order to realize the target parameter of each electrical appliance 20, the target attainment time of each target parameter (i.e., the desired value of time for the actual value of each target parameter to reach the desired value) is computed.

In the following step S5, the communication between the power plant 80, the natural energy power generation device 82, the house accumulation device 30, and the vehicle power generation/accumulation device 84 (called each power generation/accumulation device) is performed so that the information required to determine the energy supply mode (which will be described later) is acquired.

The information acquired from each power generation/accumulation device includes the maximum power supply of each power generation/accumulation device, the amount of actual power generation of each power generation/accumulation device, the amount of actual accumulation of each power generation/accumulation device, and the information as to whether the state of each power generation/accumulation device is normal.

The charging state quantity SOC of the battery 60 of the house accumulation device 30, the charging state quantity SOC of the battery 88 of the vehicle accumulation device 89, etc. are contained in the amount of actual accumulation of each power generation/accumulation device.

In the following step S6, the energy supply mode is determined. The energy supply mode determination is performed to select one of the plurality of power generation/accumulation devices that should supply power to the residence 12. If the energy supply mode is determined, the supply path of energy from at least one of the power generation/accumulation devices to the residence 12 is determined.

Figure 3:
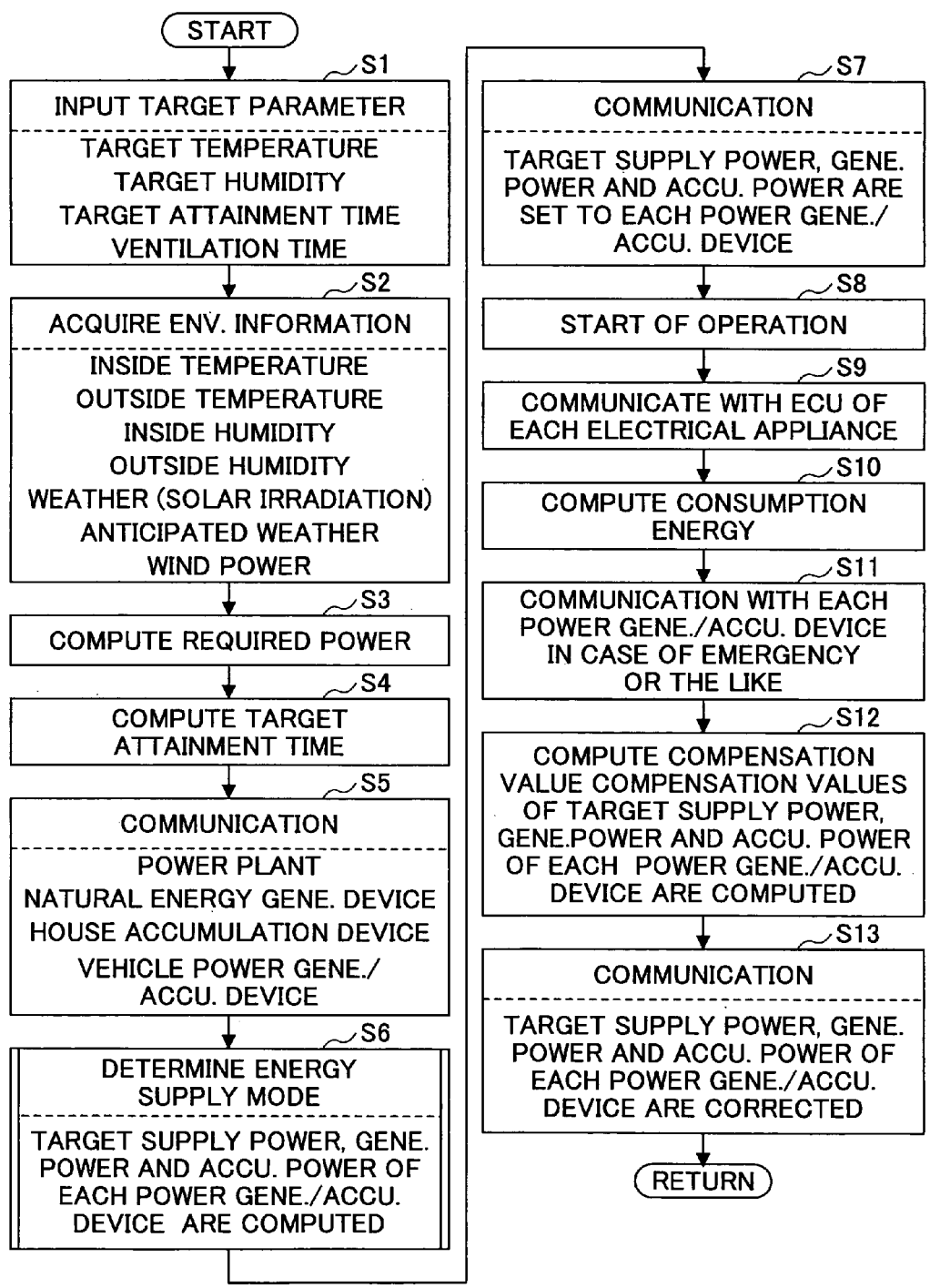
FIG. 3 is a flowchart for explaining the control procedure of the energy management program stored in the memory in the energy management device of FIG. 2.
Figure 4:
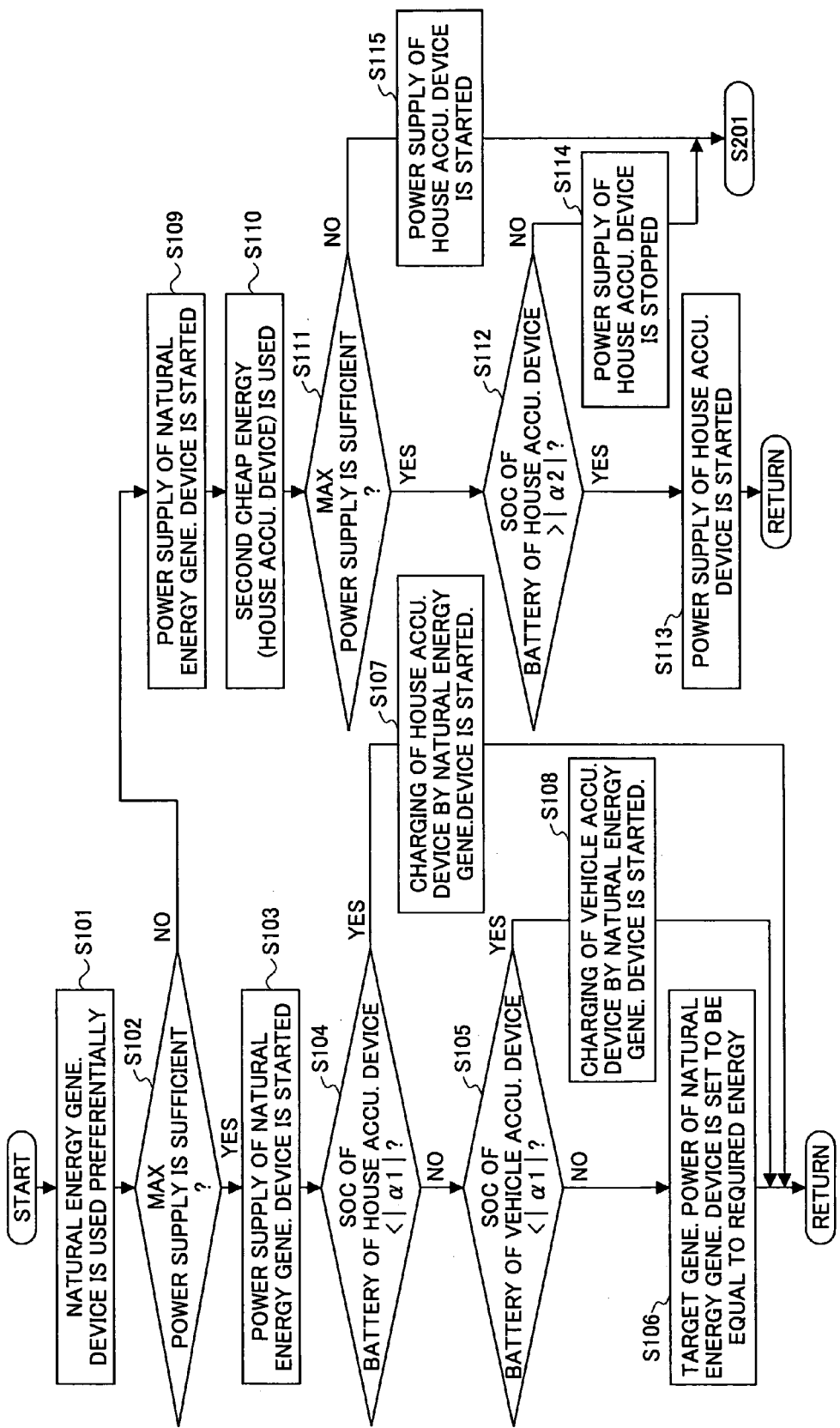
FIG. 4 is a flowchart for explaining a first part of the procedure in the step of determining the energy supply mode in the control procedure of FIG. 3.
Figure 5:
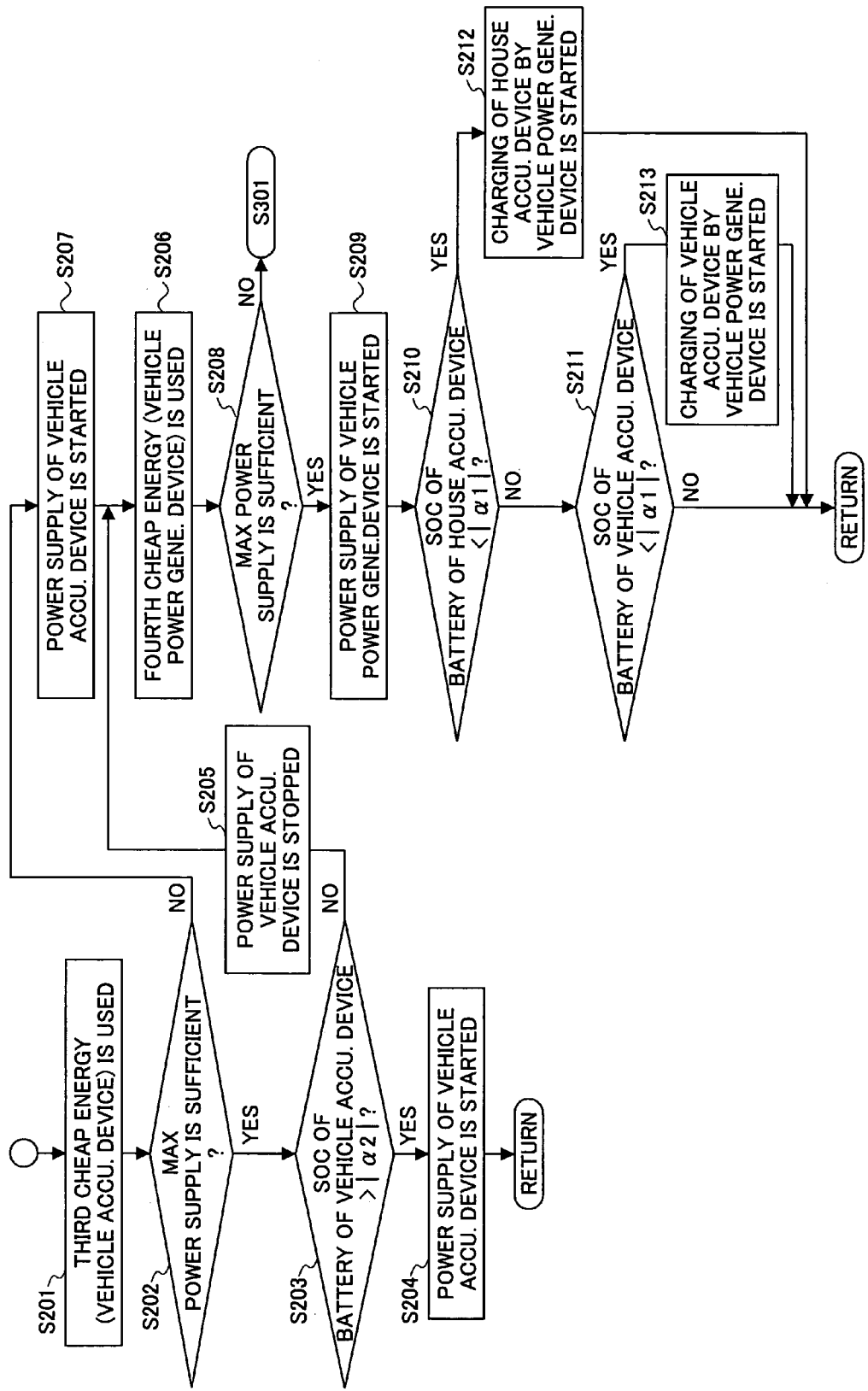
FIG. 5 is a flowchart for explaining a second part of the procedure in the step of determining the energy supply mode in the control procedure of FIG. 3.
Figure 6:
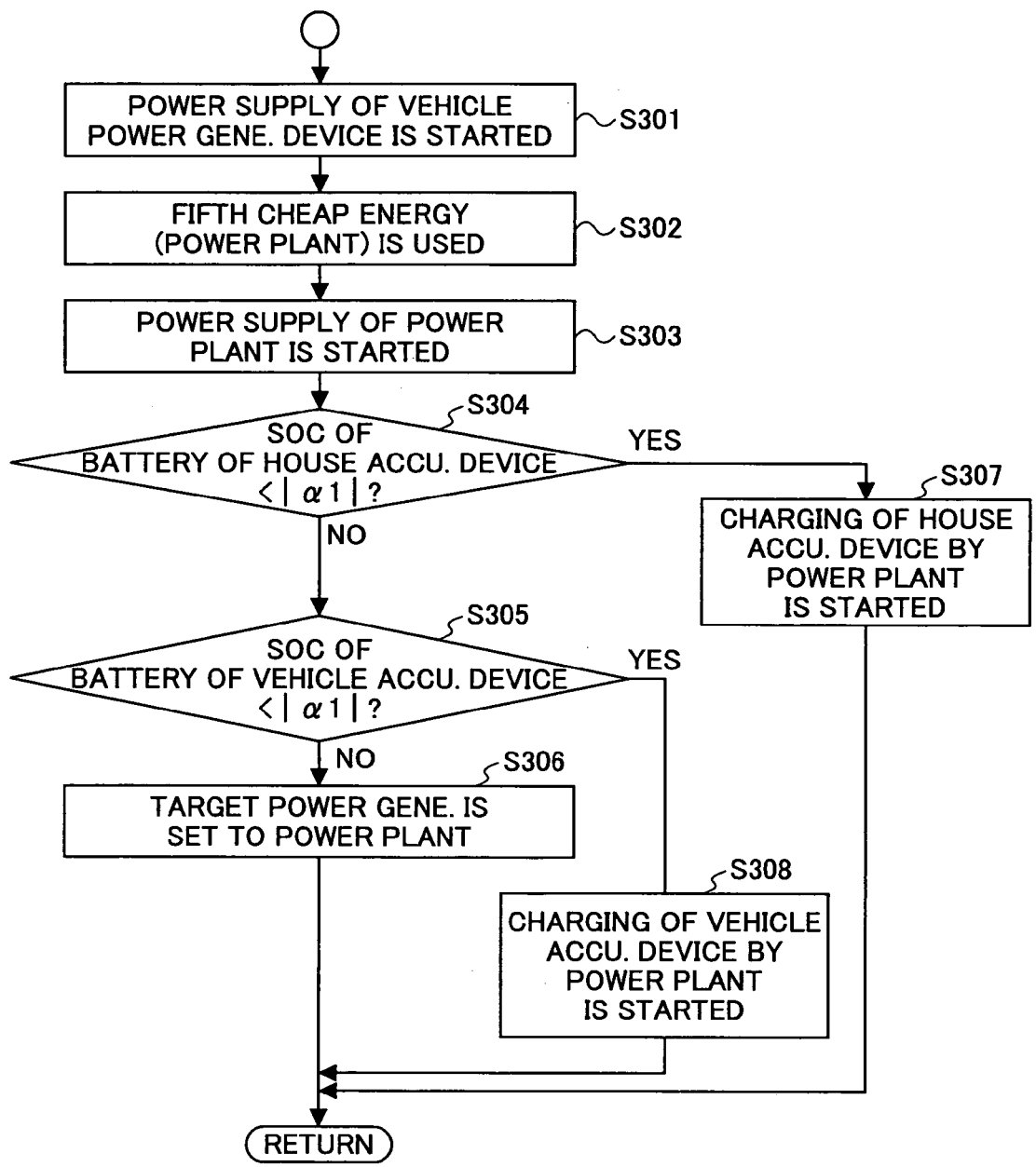
FIG. 6 is a flowchart for explaining a third part of the procedure in the step of determining the energy supply mode in the control procedure of FIG. 3.

FIG. 4, FIG. 5 and FIG. 6 show the detailed control procedure of the step S6 in the flowchart of FIG. 3. The flowcharts of FIG. 4 or FIG. 6 are illustrated in order to explain this energy supply mode determination routine.

Roughly speaking, at least one of the four power generation/accumulation devices is selected as being the optimal supplying energy to the residence 12 in the energy determination routine, and the amount of target power transmission, the amount of target power generation, and the amount of target accumulation of electricity are computed with respect to the selected power generation/accumulation device.

The selection of one of the plurality of power generation/accumulation devices is performed in the present embodiment such that a power generation/accumulation device that employs comparatively cheap energy for the same amount used is chosen preferentially among the plurality of power generation/accumulation devices.

Hereinafter, the amount of target power transmission means a desired value of the power which should be outputted to the residence 12 from each power generation/accumulation device, the amount of target power generation means a desired value of the power which should be generated by one having the power-generation capacity among the plurality of power generation/accumulation devices, and the amount of target accumulation of electricity means a desired value of the power which should be accumulated by one having the power accumulation capacity among the plurality of power generation/accumulation devices.

For example, if the power generation/accumulation device having the power generation capacity actually supplies power to the residence 12 in the amount of the target power transmission, it is necessary for the same power generation/accumulation device to generate power in the same quantity as the amount of the target power transmission, in order to replenish that device.

Therefore, in the power generation/accumulation device having the power generation capacity, the computation of the amount of target power generation may be performed so as to be equal to the amount of target power transmission.

Similarly, if the power generation/accumulation device having the power accumulation capacity actually supplies power to the residence 12 in the amount of target power transmission, it is necessary for the same power generation/accumulation device to accumulate electric power in the same quantity as the amount of target power transmission, in order to replenish that device.

Therefore, in the power generation/accumulation device having the power accumulation capacity, the computation of the amount of target power accumulation may be performed so as to be equal to the amount of target power transmission.

The amount of target power transmission, the amount of target power generation, and the amount of target power accumulation of each of the selected power generation/accumulation devices are computed in the step S6.

In the following step S7, the communication is performed between each of the selected power generation/accumulation devices, so that the computed amount of target power transmission, the computer amount of target power generation, and the computed amount of target power accumulation are set to each of the selected power generation/accumulation devices. The amount of target power transmission, the amount of target power generation, and the amount of target power accumulation which are actually processed in each power generation/accumulation device are set up.

According to the setting of the step S7, each power generation/accumulation device will operate, and required energy is supplied to the residence 12.

Namely, in the present embodiment, in order to set up the amount of target power transmission, the amount of target power generation, and the amount of target power accumulation which are actually processed in each power generation/accumulation device so that they are equal to the computed amount of target power transmission, the computed amount of target power generation, and the computed amount of target power accumulation. The request signal of the transmitting unit in the claims may be constituted with the signal transmitted to each power-generation/accumulation device from the energy management device 10.

In the following step S8, the operation of the required electrical appliance 20 is started.

In the following step S9, the required communication is performed with ECU 70 of each electrical appliance 20.

In the following step S10, the consumption energy which is actually consumed by the electrical appliance 20 is computed by referring to the measurement results of the wattmeter 74.

In the following step S11, it is determined whether a first condition that a difference between the computed consumption energy and the required energy (estimate of the consumption energy) computed in the step S3 is larger than a predetermined value is satisfied.

Furthermore, it is determined whether a second condition (an emergency case) that the energy which can be supplied to the residence 12 runs short is satisfied.

In such an emergency, the state of each power generation/accumulation device may be unusual. Specifically, when the maximum power supply of each power generation/accumulation device has declined, the power from the main source of the electric power supply to the residence 12 (for example, the power plant 80) may be stopped completely.

In the step S11, if at least one of the first and second conditions is satisfied, the communication is performed between the energy management device 10 and each power generation/accumulation device, and the information according to the contents of the satisfied conditions is transmitted to each power generation/accumulation device.

In the following step S12, the desired values (instructed to each power generation/accumulation device) of the amount of power transmission of each power generation/accumulation device, the amount of power generation, and the amount of power accumulation are corrected so that each actual value of the amount of power transmission, the amount of power generation and the amount of power accumulation of each power generation/accumulation device may be in agreement with the actual desired value. The compensation of the step S12 may be realized by carrying out the feedback compensation.

For example, in a case of emergency, the compensation including the processing which changes the power generation/accumulation device being selected so that the energy sender which substitutes for the original energy sender may be selected and the energy may be supplied to the residence 12.

In the following step S13, the communication is performed between the energy management device 10 and each power generation/accumulation device. By this communication, the setting of the amount of target power transmission the amount of target power generation and the amount of target power accumulation of each power generation/accumulation device is corrected so that the above-mentioned compensation may be reflected. By this correction, the quantity of energy consumed in order to operate each electrical appliance 20 in the residence 12 and/or the kind of energy (the operation mode) are changed.

In this manner, one execution of the energy management program is completed, and next execution is resumed if needed.

As described above, the target setting unit 40 of the energy management device 10 in FIG. 1 may be constituted with the computer 136 which executes the step S1 of FIG. 3 in the present embodiment. The environmental-information acquisition unit 42 of the energy management device 10 in FIG. 1 may be constituted with the computer 136 which executes the step S2 of FIG. 3 in the present embodiment. The optimal drive mode determination unit 44 of the energy management device 10 in FIG. 1 may be constituted with the computer 136 which executes the steps S3 and S4 of FIG. 3 in the present embodiment. Moreover, the energy supply mode determination unit 46 of the energy management device 10 in FIG. 1 may be constituted with the computer 135 which executes the steps S5 through S10 of FIG. 3 in the present embodiment. Furthermore, the operation-mode change unit 48 of the energy management device 10 in FIG.

1 may be constituted with the computer 135 which executes the steps S11 through S13 of FIG. 3 in the present embodiment.

Next, a description will be given of the energy supply mode determination routine with reference to FIG. 4 through FIG. 6.

In the energy supply mode determination routine, the natural energy is preferentially used in the residence 12.

In the step S101 of FIG. 4, the natural energy power generation device 82 is chosen as being the first candidate for the power generation/accumulation device that is used in order to supply electrical energy to the residence 12.

In the present embodiment, as the power generation/accumulation devices which can be used in order to supply electrical energy to the residence 12, there are the power plant 80, the natural energy power generation device 82, the house accumulation device 30, the vehicle power generation device 86, and the vehicle accumulation device 89, as shown in FIG. 1. However, a predetermined sequence of priority is assigned to these power generation/accumulation devices with respect to the costs required in order for each power generation/accumulation device to generate the same quantity of energy.

In the predetermined sequence, the costs increase in order of the natural energy power generation device 82, the house accumulation device 30, the vehicle accumulation device 89, the vehicle power generation device 86, and the power plant 80.

For this reason, in the present embodiment, the natural energy power generation device 82 is preferentially chosen in the step S101 as being the first cheap power generation/accumulation device which should be used by the residence 12, in order to reduce the power rates of the residence 12 as much as possible by using the cheapest natural energy among some kinds of energy.

In the following step S102, it is determined whether the maximum power supply of the selected natural energy power generation device 82 is sufficient.

Specifically, in this step S102, it is determined whether the maximum power supply of the natural energy power generation device 82 is larger than the required energy which is computed as described above. If the maximum power supply of the natural energy power generation device 82 is sufficient, the determination of S102 is affirmative.

In the following step S103, the desired value (the amount of target power transmission) of the power which the natural energy power generation device 82 should output to the residence 12 is set so that it is equal to the required energy.

Furthermore, the natural energy power generation device 82 and the residence 12 are connected electrically (relay 92 switched ON), and, thereby, the electric power supply from the natural energy power generation device 82 to the residence 12 is started.

In addition, the electric power supply from the natural energy power generation device 82 to the residence 12 will not be immediately started after the execution of the step S103. The communication with each power generation/accumulation device is performed in the step S7 of FIG. 3 after the execution of the step S103, and then the electric power supply from the natural energy power generation device 82 to the residence 12 is started actually.

Strictly speaking, in the step S103, a command (or instructions) to enable the starting of the electric power supply from the natural energy power generation device 82 to the residence 12 is only issued, and the execution of the actual power supply is not performed. This is essentially the same with respect to the steps in the following procedure. However, for the sake of convenience, a duplicate description will be omitted and it is assumed that the execution of the actual power supply is performed immediately, without making reference directly to the command (or instructions) applicable to each step.

In the following step S104, it is determined whether the charging state quantity SOC (state of charge) of the battery 60 of the house accumulation device 30 (which is the residual capacity of the battery 60) is smaller than a predetermined value alpha-1 ($\alpha$1).

The determination of the step S104 is performed in order to determine the necessity of charging of the battery 60 of the house accumulation device 30.

The charging state quantity SOC of the battery 60 is the physical quantity that expresses the percentage of the remaining electric energy of the battery 60 for each instant to the electric energy of the fully charged state. In addition, the predetermined value alpha-1 ($\alpha$1) is, for example, 80%.

If the charging state quantity SOC of the house accumulation device 30 is not smaller than the predetermined value alpha-1 (that is, the house accumulation device 30 does not need to be charged), the determination of S104 is negative and the control shifts to step S105.

In the step S105, it is determined whether the charging state quantity SOC of the battery 88 of the vehicle accumulation device 89 is smaller than the predetermined value alpha-1.

The determination of the step S105 is performed in order to determine the necessity of charging of the battery 88 of the vehicle accumulation device 89.

If the charging state quantity SOC of the vehicle accumulation device 89 is not smaller than the predetermined value alpha-1 (that is, the vehicle accumulation device 89 does not need to be charged), the determination of S105 is negative and the control shifts to step S106.

In the step S106, the desired value (the amount of target power generation) of the amount of power generation by the natural energy power generation device 82 is set so that it is equal to the required energy. By this step, it is restricted so that the electrical energy exceeding the necessary level which the natural energy power generation device 82 should supply in the relation with the residence 12 is not generated.

In this manner, one execution of the energy supply mode determination routine is completed.

On the other hand, if the charging state quantity SOC of the house accumulation device 30 is smaller than the predetermined value alpha-1 (the house accumulation device 30 needs to be charged), the determination of S104 is affirmative and the control shifts to step S107.

In the step S107, the surplus energy of the natural energy power generation device 82 is supplied to the house accumulation device 30.

Specifically, in the step S107, the desired value of the power which the natural energy power generation device 82 should output to the house accumulation device 30 is set so that it is equal to a calculated value. This calculated value is obtained by reducing the required energy from the maximum power supply of the natural energy power generation device 82.

Furthermore, the natural energy power generation device 82 and the house accumulation device 30 are connected electrically (relay 102 and relay 62 switched ON), and, thereby, charging of the house accumulation device 30 is started by the natural energy power generation device 82.

In this manner, one execution of the energy supply mode determination routine is completed.

On the other hand, if the charging state quantity SOC of the house accumulation device 30 is not smaller than the predetermined value alpha-1 and the charging state quantity SOC of the vehicle accumulation device 89 is smaller than the predetermined value alpha-1 (namely, charging of the vehicle accumulation device 89 is needed), the determination of S104 is negative and the determination of S105 is affirmative, and the control shifts to step S108.

In the step S108, the surplus energy of the natural energy power generation device 82 is supplied to the vehicle accumulation device 89.

Specifically, in the step S108, the desired value of the power which the natural energy power generation device 82 should output to the vehicle accumulation device 89 is set so that it is equal to a calculated value. This calculated value is obtained by reducing the required energy from the maximum power supply of the natural energy power generation device 82.

Furthermore, the natural energy power generation device 82 and the vehicle accumulation device 89 are connected electrically (relay 102 and relay 101 switched ON), and, thereby, charging of the vehicle accumulation device 89 is started by the natural energy power generation device 82.

In this manner, one execution of the energy supply mode determination routine is completed.

In the above-mentioned case, the maximum power supply of the natural energy power generation device 82 is sufficient in the relation with the residence 12. However, if it is not sufficient in a certain case, the determination of S102 is negative and the control shifts to step S109.

In the step S109, the electric power supply to the residence 12 is performed by combination of the natural energy power generation device 82 and another power generation/accumulation device.

Specifically, in the step S109, the desired value of the power which the natural energy power generation device 82 should supply to the residence 12 is set so that it is equal to the maximum power supply of the natural energy power generation device 82.

Furthermore, the natural energy power generation device 82 and the residence 12 are connected electrically (relay 92 switched ON), and, thereby, the electric power supply from the natural energy power generation device 82 to the residence 12 is started.

In the following step S110, the house accumulation device 30 is chosen as being the second cheap energy that should be used in the residence 12.

The electrical energy required for the residence 12 will be supplied using both the natural energy power generation device 82 and the house accumulation device 30 as a result of the selection of the step S110.

In the following step S111, it is determined whether the maximum power supply of the house accumulation device 30 is sufficient.

Specifically, it is determined whether the maximum power supply of the house accumulation device 30 is larger than a calculated value. This calculated value is obtained by reducing the actual power supply (measured value by the wattmeter 112) of the natural energy power generation device 82 from the required energy. The calculated value is equivalent to the amount of insufficient energy in the maximum power supply of the house accumulation device 30 when only the natural energy power generation device 82 is used.

If the maximum power supply of the house accumulation device 30 is sufficient, the determination of S111 is affirmative and the control shifts to step S112.

In the step S112, it is determined whether the charging state quantity SOC of the battery 60 of the house accumulation device 30 is larger than a predetermined value alpha-2 ($\alpha$2). In other words, it is determined whether electric discharging of the battery 60 of the house accumulation device 30 is appropriate. In addition, the predetermined value alpha-2 is, for example, 60%.

If the charging state quantity SOC of the house accumulation device 30 is larger than the predetermined value alpha-2, the determination of S112 is affirmative and the control shifts to step S113.

In the step S113, the desired value of the power which the house accumulation device 30 should output to the residence 12 is set so that it is equal to a calculated value. This calculated value is obtained by reducing the actual power supply (measured value by the wattmeter 112) of the natural energy power generation device 82 from the required energy. The calculated value is equivalent to the amount of insufficient energy when only the natural energy power generation device 82 is used.

Furthermore, the house accumulation device 30 and the residence 12 are connected electrically (relay 64 switched ON), and, thereby, the electric power supply from the house accumulation device 30 to the residence 12 is started.

On the other hand, if the charging state quantity SOC of the house accumulation device 30 is not larger than the predetermined value alpha-2 (electric discharging of the house accumulation device 30 is not appropriate), the determination of S112 is negative. The house accumulation device 30 and the residence 12 are electrically cut off in S114 (relay 64 switched OFF), and, thereby, the electric power supply to the residence 12 is prevented from the house accumulation device 30. Then, the control shifts to step S201 of FIG. 5.

On the other hand, if the maximum power supply of the house accumulation device 30 is not sufficient, the determination of S111 is negative and the control shifts to step S115.

In the step S115, the desired value of the power which should be supplied to the residence 12 from the house accumulation device 30 is set so that it is equal to the maximum power supply of the house accumulation device 30.

Furthermore, the house accumulation device 30 and the residence 12 are connected electrically (relay 64 switched ON), and, thereby, the electric power supply from the house accumulation device 30 to the residence 12 is started. Then, the control shifts to step S201 of FIG. 5.

In the step S201 of FIG. 5, the vehicle accumulation device 89 is chosen as being the third cheap energy that should be used in the residence 12.

In the following step S202, it is determined whether the maximum power supply of the vehicle accumulation device 89 is sufficient.

Specifically, it is determined whether the maximum power supply of the vehicle accumulation device 89 is larger than a calculated value. This calculated value is obtained by reducing, from the required energy, a sum of the actual power supply (measured value by the wattmeter 112) of the natural energy power generation device 82 and the actual power supply (measured value by the wattmeter 115) of the house accumulation device 30. This sum is equivalent to the amount of insufficient energy for the maximum power supply of the vehicle accumulation device 89 when only the natural energy power generation device 82 and the house accumulation device 30 are used.

If the maximum power supply of the vehicle accumulation device 89 is sufficient, the determination of S202 is affirmative. In the following step S203, it is determined whether the charging state quantity SOC of the battery 88 of the vehicle accumulation device 89 is larger than the predetermined value alpha-2. In other words, it is determined whether the electric discharging of the battery 88 is appropriate.

If the charging state quantity SOC of the vehicle accumulation device 89 is larger than the predetermined value alpha-2, the determination of S203 is affirmative and the control shifts to step S204.

In the following step S204, the desired value of the power which the vehicle accumulation device 89 should output to the residence 12 is set so that it is equal to a calculated value. This calculated value is obtained by reducing, from the required energy, the sum of the actual power supply (measured value by the wattmeter 112) of the natural energy power generation device 82 and the actual power supply (measured value by the wattmeter 115) of the house accumulation device 30 (that is, the amount of insufficient energy in the case of using only the natural energy power generation device 82 and the house accumulation device 30).

Furthermore, the vehicle accumulation device 89 and the residence 12 are connected electrically (relay 94 switched ON), and, thereby, the electric power supply from the vehicle accumulation device 89 to the residence 12 is started.

On the other hand, if the charging state quantity SOC of the vehicle accumulation device 89 is larger than the predetermined value alpha-2 (electric discharging of the vehicle accumulation device 89 is not appropriate), the determination of S203 is negative, the vehicle accumulation device 89 and the residence 12 are electrically cut off in S205 (relay 94 switched OFF), and, thereby, the electric power supply to the residence 12 is prevented from the vehicle accumulation device 89. Then, the control shifts to the step S206.

On the other hand, if the maximum power supply of the vehicle accumulation device 89 is not sufficient, the determination of S202 is negative and the control shifts to step S207.

In the step S207, the desired value of the power which should be supplied to the residence 12 from the vehicle accumulation device 89 is set so that it is equal to the maximum power supply of the vehicle accumulation device 89.

Furthermore, the vehicle accumulation device 89 and the residence 12 are connected electrically (relay 94 switched ON), and, thereby, the electric power supply from the vehicle accumulation device 89 to the residence 12 is started. Then, the control shifts to step S206.

In the step S206, the vehicle power generation device 86 is chosen as being the fourth cheap energy that should be used in the residence 12.

In the following step S208, it is determined whether the maximum power supply of the vehicle power generation device 86 is sufficient.

Specifically, it is determined in the step S208 whether the maximum power supply of the vehicle power generation device 86 is larger than a calculated value. This calculated value is obtained by reducing, from the required energy, a sum of the actual power supply (measured value by the wattmeter 112) of the natural energy power generation device 82, the actual power supply (measured value by the wattmeter 115) of the house accumulation device 30, and the actual power supply (measured value by the wattmeter 117) of the vehicle accumulation device 89. This sum is equivalent to the amount of insufficient energy in the maximum power supply of the vehicle power generation device 86 when only the natural energy power generation device 82, the house accumulation device 30 and the vehicle accumulation device 89 are used.

If the maximum power supply of the vehicle power generation device 86 is sufficient, the determination of S208 is affirmative. In the following step S209, the desired value of the power which the vehicle power generation device 86 should output to the residence 12 is set so that it is equal to a calculated value. This calculated value is obtained by reducing, from the required energy, the actual power supply (measured value by the wattmeter 112) of the natural energy power generation device 82, the actual power supply (measured value by the wattmeter 115) of the house accumulation device 30, and the actual power supply (measured value by the wattmeter 117) of the vehicle accumulation device 89.

Furthermore, the vehicle power generation device 86 and the residence 12 are connected electrically (relay 96 switched ON), and, thereby, the electric power supply from the vehicle power generation device 86 to the residence 12 is started.

In the following step S210, it is determined whether the charging state quantity SOC of the battery 60 of the house accumulation device 30 is smaller than the predetermined value alpha-1. That is, it is determined whether the battery 60 of the house accumulation device 30 needs to be charged.

If the charging state quantity SOC of the house accumulation device 30 is not smaller than the predetermined value alpha-1 (the house accumulation device 30 does not need to be charged), the determination of S210 is negative and the control shifts to S211.

In the step S211, it is determined whether the charging state quantity SOC of the battery 88 of the vehicle accumulation device 89 is smaller than the predetermined value alpha-1. That is, it is determined whether the battery 88 of the vehicle accumulation device 89 needs to be charged.

If the charging state quantity SOC of the vehicle accumulation device 89 is not smaller than the predetermined value alpha-1 (the vehicle accumulation device 89 does not need to be charged), the determination of S211 is negative. Then, one execution of the energy supply mode determination routine is completed.

On the other hand, if the charging state quantity SOC of the house accumulation device 30 is smaller than the predetermined value alpha-1 (the house accumulation device 30 needs to be charged), the determination of S210 is affirmative and the surplus energy of the vehicle power generation device 86 is supplied to the house accumulation device 30 in S212.

Specifically, in the step S212, the desired value of the power which the vehicle power generation device 86 should output to the house accumulation device 30 is set so that it is equal to a calculated value. This calculated value is obtained by reducing the actual power supply (measured value by the wattmeter 112) of the vehicle power generation device 86 from the maximum power supply of the vehicle power generation device 86.

Furthermore, the vehicle power generation device 86 and the house accumulation device 30 are connected electrically (relay 103 and relay 62 switched ON), and, thereby, charging of the house accumulation device 30 is started by the vehicle power generation device 86.

In this manner, one execution of the energy supply mode determination routine is completed.

On the other hand, if charging of the house accumulation device 30 is unnecessary but the vehicle accumulation device 89 needs to be charged, the determination of S210 is negative and the determination of S211 is affirmative. In the following step S213, the surplus energy of the vehicle power generation device 86 is supplied to the vehicle accumulation device 89.

Specifically, in the step S213, the desired value of the power which the vehicle power generation device 86 should output to the vehicle accumulation device 89 is set so that it is equal to a calculated value. This calculated value is obtained by reducing the actual power supply (measured value by the wattmeter 119) of the vehicle power generation device 86 from the maximum power supply of the vehicle power generation device 86.

Furthermore, the vehicle power generation device 86 and the vehicle accumulation device 89 are connected electrically (relay 103 and relay 104 switched ON), and, thereby, charging of the vehicle accumulation device 89 is started by the vehicle power generation device 86.

In this manner, one execution of the energy supply mode determination routine is completed.

In the above-mentioned case, the maximum power supply of the vehicle power generation device 86 is sufficient in the relation with the residence 12. However, if it is not sufficient in a certain case, the determination of S208 is negative and the control shifts to S301 of FIG. 6.

In the step S301, the vehicle power generation device 86 and the residence 12 are connected electrically (relay 96 switched ON), and, thereby, the electric power supply from the vehicle power generation device 86 to the residence 12 is started.

In the following step S302, the power plant 80 is chosen as the fifth cheap energy that should be used in the residence 12.

In the following step S303, the desired value of the power which the vehicle power generation device 86 should output to the residence 12 is set so that it is equal to a calculated value. This calculated value is obtained by reducing, from the required energy, the actual power supply (measured value by the wattmeter 112) of the natural energy power generation device 82, the actual power supply (measured value by the wattmeter 115) of the house accumulation device 30, the actual power supply (measured value by the wattmeter 117) of the vehicle accumulation device 89, and the actual power supply (measured value by the wattmeter 119) of the vehicle power generation device 86.

Furthermore, the power plant 80 and the residence 12 are connected electrically (relay 90 switched ON), and, thereby, the electric power supply from the power plant 80 to the residence 12 is started.

In the following step S304, it is determined whether the charging state quantity SOC of the battery 60 of the house accumulation device 30 is smaller than the predetermined value alpha-1. In other words, it is determined whether the battery 60 of the house accumulation device 30 needs to be charged.

If the charging state quantity SOC of the house accumulation device 30 is not smaller than the predetermined value alpha-1, the determination of S304 is negative and the control shifts to S305.

In the step S305, it is determined whether the charging state quantity SOC of the battery 88 of the vehicle accumulation device 89 is smaller than the predetermined value alpha-1. In other words, it is determined whether the battery 88 of the vehicle accumulation device 89 needs to be charged.

If the charging state quantity SOC of the vehicle accumulation device 89 is not smaller than the predetermined value alpha-1, the determination of S305 is negative and the control shifts to S306.

In the step S306, the amount of target power generation of the power plant 80 is set so that it is equal to a calculated value. This calculated value is obtained by reducing, from the required energy, the actual power supply (measured value by the wattmeter 112) of the natural energy power generation device 82, the actual power supply (measured value by the wattmeter 115) of the house accumulation device 30, the actual power supply (measured value by the wattmeter 117) of the vehicle accumulation device 89, and the actual power supply (measured value by the wattmeter 119) of the vehicle power generation device 86.

In this manner, one execution of the energy supply mode determination routine is completed.

On the other hand, if the charging state quantity SOC of the house accumulation device 30 is smaller than the predetermined value alpha-1 (the house accumulation device 30 needs to be charged), the determination of S304 is affirmative and the surplus energy of the power plant 80 is supplied to the house accumulation device 30 in S307.

Specifically, in the step S307, the desired value of the power which the power plant 80 should output to the house accumulation device 30 is set up so that it is equal to a calculated value. This calculated value is obtained by reducing the actual power supply (measured value by the wattmeter 110) of the power plant 80 from the maximum power supply of the power plant 80.

Furthermore, the power plant 80 and the house accumulation device 30 are connected electrically (relay 100 and relay 62 switched ON), and, thereby, charging of the house accumulation device 30 is started by the power plant 80.

In this manner, one execution of the energy supply mode determination routine is completed.

On the other hand, if charging of the house accumulation device 30 is unnecessary but the vehicle accumulation device 89 needs to be charged, the determination of S304 is negative and the determination of S305 is affirmative, and the surplus energy of the power plant 80 is supplied to the vehicle accumulation device 89 in S308.

Specifically, in the step S308, the desired value of the power which the power plant 80 should output to the vehicle accumulation device 89 is set so that it is equal to a calculated value. This calculated value is obtained by reducing the actual power supply (measured value by the wattmeter 110) of the power plant 80 from the maximum power supply of the power plant 80.

Furthermore, the power plant 80 and the vehicle accumulation device 89 are connected electrically (relay 100 and relay 101 switched ON), and, thereby, charging of the vehicle accumulation device 89 is started by the power plant 80.

In this manner, one execution of the energy supply mode determination routine is completed.

As is apparent from the foregoing description of the preferred embodiments, the energy management device of the present invention may be constituted as follows.

The communication unit in the claims may be constituted with the communication device 54 and the computer 136 which executes the step S5 of FIG. 3. The supply control unit in the claims may be constituted with the computer 136 which executes the steps S6, S7, S11, S12 and S13 in FIG. 3.

Furthermore, the transmitting unit in the claims may be constituted with the computer 136 which executes the step S7 in FIG. 3. The exchange unit in the claims may be constituted with the computer 136 which executes the step S5 in FIG. 3. The control unit in the claims may be constituted with the computer 136 which executes the step S3 in FIG. 3.

The present invention is not limited to the above-described embodiments, and variations and modifications may be made without departing from the scope of the present invention.

What is claimed is:

1. An energy management device which is provided in a first energy related system and manages transfer of energy between the first energy related system and a second energy related system remote from the first energy related system, each of the first and second energy related systems including, as an energy related element, at least one of an accumulation unit which accumulates energy, a consumption unit which consumes energy, and a generation unit which generates energy, the energy management device comprising:

a communication unit exchanging information between the first energy related system and the second energy related system, the information relating to at least one of an energy consumption, an energy accumulation and an energy generation in each of the first and second energy related systems; and a supply control unit controlling supplying of energy from one of the first and second energy related systems to the other based on contents of exchanged information and a request for the supplying of energy.

2. The energy management device according to claim 1 wherein the supply control unit comprises a transmitting unit transmitting, prior to the supplying of energy from one of the first and second energy related systems, which is an energy sender, to the other of the first and second energy related systems, which is an energy receiver, a request signal for requesting the supplying of energy of the energy sender to the energy receiver, from the energy receiver to the energy sender, and the energy sender receives the request signal from the energy receiver and transmits a response signal to the energy receiver, so that the energy sender supplies energy to the energy receiver.

3. The energy management device according to claim 1 wherein signals, received and transmitted by the supply control unit, in order to exchange information between the first energy related system and the second energy related system, include a request signal for requesting the supplying of energy of one of the first and second energy related systems to the other, and a response signal for permitting the request of the supplying of energy of one of the first and second energy related systems to the other.

4. The energy management device according to claim 1 wherein the communication unit comprises an exchange unit the information between the first energy related system and the second energy related system prior to shifting of a first state in which energy delivery and receiving of energy between the first and second energy related systems is not possible to a second state in which energy delivery and receiving of energy between the first and second energy related systems is possible.

5. The energy management device according to claim 1 wherein the second energy related system comprises a plurality of other energy related systems different from the first energy related system, the communication unit is configured to exchange the information between the first energy related system and the plurality of other energy related systems, and the supply control unit is configured to select one of the plurality of other energy related systems as being a system delivering and receiving energy between the first energy related system and the plurality of other energy related systems, based on the contents of the exchanged information.

6. The energy management device according to claim 5 wherein the supply control unit comprises:

a target setting unit setting a desired value required for control of the first energy related system; and a selection unit selecting one of the plurality of other energy related systems for supplying energy to the first energy related system, based on the desired value and the contents of the exchanged information.

7. The energy management device according to claim 6 wherein the selection unit comprises:

an environmental-information acquisition unit acquiring environmental information related to an environment which affects a consumption of energy in the first energy related system; and an energy supply mode determination unit selecting one of the plurality of other energy related systems as supplying energy to the first energy related system, based on acquired environmental information, the desired value, and the contents of the exchanged information, so that the energy supply mode determination unit determines an energy supply mode of supplying energy to the first energy related system.

8. The energy management device according to claim 1 further comprising a control unit controlling the first energy related system and computing a desired value for controlling the first energy related system by using power or workload as a unit which is common to the first energy related system and the second energy related system.

9. The energy management device according to claim 1 wherein the first energy related system comprises at least two of the consumption unit, the accumulation unit and the generation unit as energy related elements, and the energy management device further comprising a control unit controlling said at least two energy related elements and computing a desired value and an actual value required for control of each of said at least two energy related elements by using power or workload as a unit that is mutually common between said at least two energy related elements.

10. The energy management device according to claim 1 wherein the first energy related system comprises at least one of the consumption unit and the generation unit as the energy related element.

* * * * *